March 1, 1955

K. R. HOYT 2,703,340

COLOR TELEVISION SYSTEM

Filed July 20, 1951

INVENTOR.
Karl Robert Hoyt
BY
Stedman B. Hoar
Agent

United States Patent Office 2,703,340

Patented Mar. 1, 1955

2,703,340

COLOR TELEVISION SYSTEM

Karl Robert Hoyt, Newport Beach, Calif., assignor of twelve and one-half per cent to Walter Mellott, twelve and one-half per cent to Otto Culbertson, twelve and one-half per cent to James S. Barrett, and twelve and one-half per cent to Thomas B. Frost, all of Orange County, Calif.

Application July 20, 1951, Serial No. 237,790

12 Claims. (Cl. 178—5.4)

This invention relates to systems for obtaining television images reproduced in natural color and more particularly relates to systems of the stated general classification falling within the group commonly known as additive color systems.

A major problem confronting the many experimenters in this art has been that of devising a color system would be compatible with existing systems for receiving television in black and white and which would afford a high degree of color fidelity and yet be relatively free of such objectionable features as color flicker and line-crawl. As is well known, the standard system now adopted for achromatous television is a two-field scanning system operating at a frequency of sixty fields per second, or thirty complete picture frames per second, in which one field consists of the odd-numbered lines of a 525 line frame, and the other field consists of the even-numbered lines. Because of the great number of television receiving sets now in use, it is highly desirable that these frequencies and line numbers be retained; otherwise, the existing sets would require extensive and expensive rebuilding.

It has been known for some time that it is a relatively simple matter to adapt a bi-chromatic additive color system to the present sixty field per second black and white system—for example, by color disks which synchronously place red filters in front of the camera and the receiving raster during the reproduction of, say, the odd-line field and likewise place greenish blue filters during reproduction of the even-line field. Although few mechanical and no electronic changes are required for such a system, color fidelity is not of high quality, yellows and purples being noticeably absent and the other colors being coarse. It has been the considered opinion of those engaged in and responsible for the development of the television industry, in commercial as well as governmental positions, that lack of fidelity made such a system undesirable as a standard to be imposed on the industry and the public.

In addition to certain line-sequential and dot-sequential systems which for various reasons have not met with acceptance, it has been proposed to increase the number of fields of a field sequential system to a number divisible by three in order to accommodate tri-chromatic color, even though such increase involved greatly increasing the scanning speed and even reducing the number of lines of each field. Such a system obviously requires re-building of existing receiving sets. It has also been subject to official criticism as coarsening the resultant picture by reason of having fewer lines and as producing flicker and line-jump by reason of a relatively slow rate of color coincidence, that is, the reappearance of a particular color at a particular line.

It is a principal object of my invention to provide a tri-chromatic additive color system compatible with existing television systems and apparatus, or—more precisely—compatible with 2-field scanning at the present standard rate of 60 fields per second or at any comparable or faster rate which may be later adopted as standard.

It is a further object of my invention to provide an additive color system compatible with 2-field scanning, which is substantially free of line-jump and color flicker.

Still another object of my invention is to provide apparatus of low cost and great simplicity for converting existing television transmitters and receiving sets so as to enable the receiving sets to produce images in natural color.

It is a further object of my invention to provide a method of coloring television pictures which is particularly advantageous in its application to television pick-up tubes or iconoscopes having a biased color-selective photo-sensitivity.

To attain the above-stated objectives, I make use of well-known techniques of synchronizing color-additive apparatus at the receiving set with color-subtractive apparatus at the camera, but with novel selection and sequence of colors. Red, blue, and green are generally considered the basic or complementary colors in color photography and television, and are so termed herein, but reference to these colors is not to be interpreted as designating color of a specific hue but rather as designating broadly the end and central portions of the spectrum in which these colors are found. For simplicity in description it will be assumed for the moment that the color-subtractive and color-additive apparatus are of the well-known color disk type, although either or both may be of drum type or of any other form of apparatus capable of the subtractive or additive processes. It will also be assumed that the iconoscope of the system has a photo-sensitivity bias toward the blue end of the spectrum, such being the usual case with iconoscopes of present manufacture. In broad terms and assuming the use of disks, my invention comprises utilization of a sequence of four sectorial color filters, instead of the conventional two or three sector sequences, in which sequence two of the filter sectors are representative of the end of the spectrum to which the biased iconoscope is least sensitive—in the assumed case, the red end—and are in alternation with a filter sector representative of the central or green portion of the spectrum and a filter sector representative of the more sensitive or blue end of the spectrum. The sequential arrangement is red, green, red, blue. The two red filters may be of the same hue or one may be closer to the orange than the other. By appropriate balancing as to both hue and density, the four filters may be made to transmit white light when rapidly rotated before a white screen, and such balancing is desirable. When such a disk is applied in synchronization with field changes to a two-field interlace, one field of each frame will be constantly subject to red segregation and addition, and the other field will alternately be subject to green and to blue segregation and addition. Obviously, such a disk may be rotated to synchronize with present standard television frequency of 60 fields per second; if the disk has four sectors, the rotational speed will be 15 R. P. S. If the iconoscope is so biased as to be least sensitive to a portion of the spectrum other than the red portion, the repetitive filter sectors affecting one field of the interlace will be selected from that portion of the spectrum and the other filter sectors will be selected from the portions of the spectrum containing the other two primary colors.

The optical theories underlying my invention and the method of its operation will be discussed hereinafter.

In the accompanying drawing illustrative of presently preferred apparatus embodying the principles of my invention, Fig. 1 shows schematically transmitting and receiving apparatus inclusive of color-filtering disks;

Figure 1:
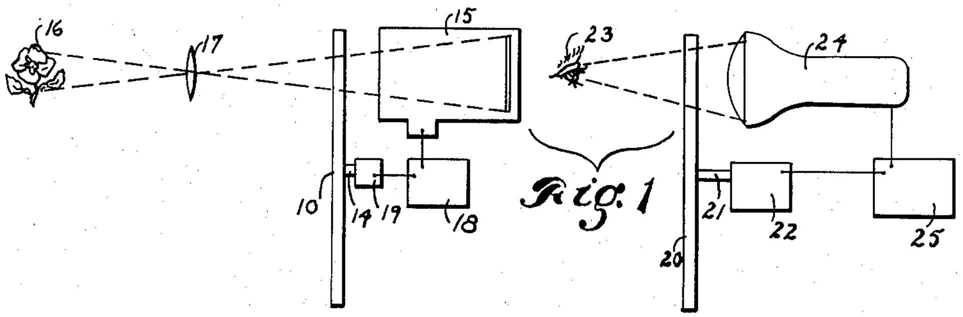
Figure 2:
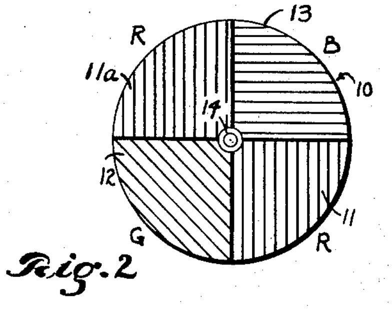
Fig. 2 shows a color filter disk having sectors colored and arranged in accord with a preferred form of my invention.
Figure 3:
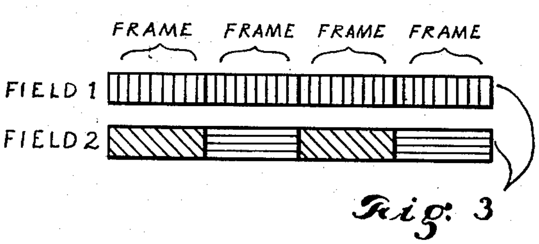
Fig. 3 shows schematically the resultant coloring of a sequence of frames of a 2-field interlace.

Having reference to the details of the drawing, I have shown in Figs. 1 and 2 a color disk 10 having two transparent sectors 11 and 11a capable of transmitting light selected from the red end of the spectrum and transparent sectors 12 and 13 capable of transmitting light selected respectively from the central or green portion of the spectrum and from the blue end of the spectrum. The disk is mounted for rotation upon a shaft 14. It will be understood that the transparent sectors may be eight in number, or twelve, or any number divisible into repetitive series of four.

The disk 10 is mounted so that its sectors pass successively in front of the photosensitive face of a pick-up tube 15 upon which the image of a scene 16 is focussed by optical apparatus 17, the disk being out of focus. Such an arrangement is well known, and it is to be understood that the cathode ray of the tube 15 scans successively two field areas upon which the image of the scene 16 appears, in the manner conventional to television apparatus of the present standards. Suitable synchronizing means 18 maintain a motor 19 revolving the disk 10 at a speed at which the sectors 11 and 11a pass between the optical apparatus 17 and the tube 15 synchronously with the scanning of one field area and the sectors 12 and 13 pass alternately synchronously with the scanning of the other field area.

In the receiving apparatus illustrated at the right of Fig. 1, a similar disk 20 is mounted upon a shaft 21 so as to be rotated by a motor 22 across the line of vision from an observer 23 to the receiving raster of the receiving tube 24. The receiving tube 24 scans successively two field areas in synchronization with the scanning of like field by the pick-up tube 10, and suitable synchronizing means 25 maintain the rotation of the disk 20 in phase with the field-scanning of the tube 24 and in color phase with the disk 10.

Except for the coloring and sequential arrangements of the disks 10 and 20, the foregoing is descriptive of apparatus well understood by those skilled in the art. The disk 20 is not illustrated in detail, as it will conform in color and sequence to the disk 10. It is to be understood, however, that the disks are merely illustrative of color and sequence, and that other suitable forms of color-separative and color-additive apparatus may be substituted for them.

When the disks 10 and 20 are rotated in color-phase relationship in synchronization with the two-field scanning, the red color components of one of the fields will be reproduced, and the green and blue color components of the other field will be alternately reproduced, these components being blended by an observer's vision to produce pictures of natural color.

Figure 4:
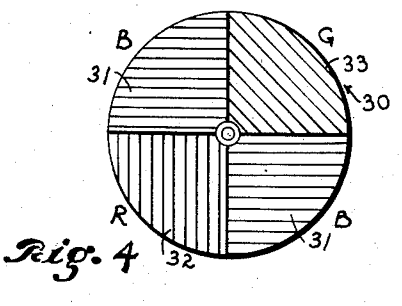
Fig. 4 shows a color filter disk having sectors colored in a modified arrangement.
Figure 5:
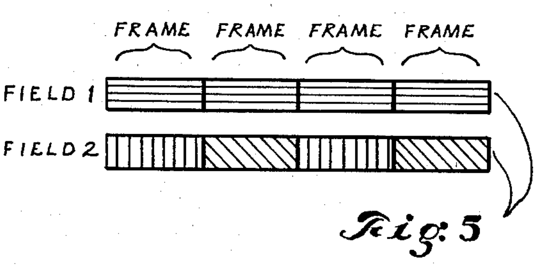
Fig. 5 shows schematically the coloring of a sequence of frames of a 2-field interlace resulting from the disk arrangement of Fig. 4.

The filter disk 30 illustrated in Fig. 4 differs in color arrangement from the disks 10 and 20, in that it has two opposed sectors 31 which transmit light selected from the blue end of the spectrum, and two opposed sectors 32 and 33 which respectively transmit color selected from the red end of the spectrum, and color selected from the central, or green, portion of the spectrum. When such disks 30 are operated at the camera and receiver in the manner described for the disks 10 and 20, one of the interlaced scanning fields at the receiver will consistently show the blue color components of the corresponding field at the camera, and the other field will alternately show red and green color components, as shown in Fig. 5.

Figure 6:
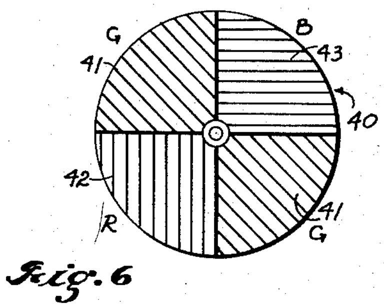
Fig. 6 shows a further modified arrangement of a color filter disk.
Figure 7:
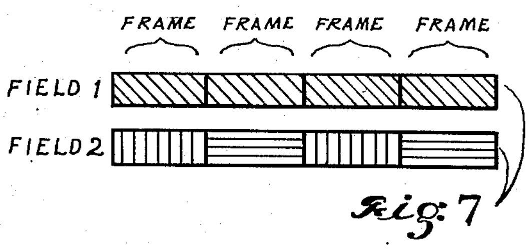
Fig. 7 shows schematically the coloring of a sequence of frames of a 2-field interlace resulting from the disc arrangement of Fig. 6.

Likewise, the filter disk 40 shown in Fig. 6 has opposed sectors 41 which transmit color selected from one zone of the spectrum, in this instance the green or central portion, and alternating sectors 42 and 43 transmitting color selected from the complementarily available portions of the spectrum, in this instance the end zones of the spectrum. The arrangement affords reproduction of green components in one field, and red and blue components alternately in the other field.

As hereinbefore stated, iconoscopes or pick-up tubes now in use are apparently more sensitive to blue or green light than to red light, which may be termed as having a photosensitive bias toward the blue end of the spectrum. Consequently, if blue, green, and red light rays of equal brightness are directed upon an iconscope, the iconscope will emphasize the electronic pick-up of the blue and the green light, to the relative de-emphasis of the electronic pick-up of the red light.

Paradoxically, if the unbalanced electronic impulses are transmitted to and reproduced pictorially on a receiving raster in rapid succession, the emphasis will appear to be upon red. The pictorial representation on the receiving raster will of course be in black and white, which is the explanation of the paradox. The emphasis on red at the receiver is a matter of light, not of color. Less electronic impulse having been transmitted in response to red light, the receiver will luminesce with relatively low brilliance. If the receiving raster appears whitely luminescent in response to excitation of blue origin, it may be nearly as white in response to excitation of green origin, but gray or dark in response to excitation of red origin. The observing eye sees the brightness representative of blue and green, but the vision is interrupted by the relative darkness representative of red. If the dark intervals occur with a frequency of one in three, observers will attribute resultant flicker to the dark intervals, thereby mentally attributing to one color—which is red, though unidentifiable—an emphasis which is electronically a de-emphasis.

Now if red, green, and blue filters of equal density are placed in the observer's line of sight to the receiving raster in a rapid tripartite sequence, to replace additively the colors imposed upon the pick-up tube, the blue and the green will appear bright because of relatively high luminescence and the red will appear darker and duller than it should. The red is of course now identifiable, and an observer will again mentally attribute to that color such flicker as he may observe, because that color is responsible for the dark intervals of shorter duration—in the assumed case, one-third of the cycle—than the bright intervals which attract his visual powers.

That it should now be proposed to increase the amount—that is, the relative duration in the scanning cycle—of the already apparently over-emphasized color may again seem paradoxical. But the phenomenon of flicker is primarily due to changes of light intensity as related to time, and but little due to changes in color. Two colors, even widely separated in the spectrum, will produce little flicker in a repetitive cycle of considerably less than television scanning speed, if photometrically balanced. What my system of color distribution actually accomplishes is to double the frequency of the dark interval, thereby reducing its power to create flicker even though the total amount of relative darkness in the cycle is increased.

While the effect of tube color-bias and of color-separation in a television transmitting system is to modify the transmitted electronic signals, the modification is in accord with the modified photo-sensitization of the scanned emulsion surface by the light incident thereon, as further modified by the tube bias. It will be observed that my color system is entirely an optical system, which changes neither the electronic system nor the scanning system of the pick-up apparatus, but does effectively result in a photo-sensitization of the scanned surface so modified by color-separation and by frequency of color appearance that the transmitted electronic signals, while in themselves possibly overmodified, will produce an optical effect at either a black-and-white receiver or a color receiver in which overmodification of one scanned field relatively to the other is imperceptible.

Although it is customary to refer to a pick-up tube as having a bias toward one end of the spectrum or the other, and that terminology is followed herein, it will be found in practice that the bias includes a considerable portion of the spectrum to a gradually diminishing degree. Thus, if the pick-up tube is biased toward the blue, as in the example given, it will create electronic impulses of only slightly less intensity when exposed to green light. As the successive colors of the spectrum towards the red contain less and less blue light, the decrease in sensitivity of the pick-up tube becomes greater. For this reason, green may be considered nearly the equivalent of blue in the production of electronic impulses, and yellow and orange approach the level of red. There will be but little difference in light intensity between green and blue, and consequently but little difference in the relative light intensity of blue and red, and green and red. Therefore, the occurrence of a strong light contrast at frame frequency is avoided; the contrasts occur at field frequency and are closely related in magnitude.

As an example of the above condition, in experiment with a pick-up tube which may be taken as representative of present standards of photosensitive bias, I have successively projected light of constant intensity through photometrically balanced blue, green, and red filters upon a pick-up tube, and have measured with a densitometer the resultant brightness of these colors as they appeared on a receiving raster when also viewed through photometrically balanced filters. The over-all densitometric level will, of course, vary with the filter level and the initial light source level, but densitometer readings of 55 for blue, 65 for green, and 120 for red may be taken as representative. The effect of doubling the frequency of appearance of the red relatively to either of the other colors is very nearly the same as cutting its densitometer reading in half, and thereby achieving a light balance which minimizes flicker.

The densitometer readings of 55, 65, and 120 may be taken as maximum under the experimental conditions, as they obviously relate to colors of high and balanced purity. In broadcasting and receiving television, the maximum brightness will occur, under any given lighting condition, when an object of the precise hue of a filter is scanned through that filter, as the filter will then transmit all the light received from that object. It is only when such objects, or their approximates, appear in the scene that flicker ordinarily occurs on the viewing raster. Mild and mixed colors, and pastel shades, produce little contrasting brightness and therefore little flicker. When the frequency of the additive colors is substantially inversely proportionate to their relative maximum brightness, even the appearance in the scene of objects approximating the hue of the filters will not produce flicker because the interval of appearance offsets the contrasts.

The system of coloring herein described is ideally applicable to and fully compatible with present standards of television. Scanning the scene in a bipartite spacial cycle, as with the present standard 2-field system, affords a suitable base for coincident application of a quadripartite color cycle. The standard of 525 lines to a frame permits a close relationship of lines which minimizes the chance that some tiny bit of color will be missed because it occurs on a line not scanned in like color. The standard frequencies of 30 frames and 60 fields per second are well suited to the proposed color frequency, in which one color appears 15 times per second, another color appears 15 times per second and a third color, contrasting in brightness, appears 30 times a second. The addition of simple coloring and synchronizing apparatus to camera and receiver is all that is required to convert present achromatous television to my system.

A particular advantage of my system in its application to present standard television is the elimination of line-crawl which has confounded the efforts of other experimenters in color. Line-crawl, like flicker, is a result of difference of brightness, and is most noticeable in some color systems because colors change position on the raster. If the red color is consistently darker than the blue or the green and moves back and forth between the odd-numbered lines of the raster and the even-numbered lines, the eye will translate the movement into a stroboscopic effect which makes dark lines appear to crawl in one direction across the raster. As in my system, the color relatively lacking in brightness appears consistently at the same lines of the raster, there is no such stroboscopic effect, or at least none that is attributable to color and that is not inherent in present achromatous television.

As many modifications are possible in the application of my system to television without departure from the scope and spirit of my invention, I do not wish to be limited to the examples herein given, but desire my invention to be interpreted as broadly inclusive of all matters within the scope of the appended claims.

I claim:

1. In a color television system, in combination with scanning means for transmitting and for receiving a picture composed of two spacial fields, color-selective means operable in a four-phase color-cycle for producing transmittable images representing color components of said picture, the first and third phases of said color selective means being of color selected from the red end of the spectrum, and the second and fourth phases being respectively of color selected from the central portion and from the blue end of the spectrum; means for synchronizing the first and third phases of said color-selective means with one field of said transmitting scanning means and the second and fourth phases with the other field thereof; color-additive means operable in a like four-phase cycle and having phases of like colors corresponding to the phases of said color-selective means for adding color to the field images of said receiving scanning means; and means for synchronizing said color additive means in phase with said color-selective means.

2. In a color television system, in combination with scanning means for transmitting and for receiving a picture composed of two spacial fields: color-selective apparatus operable in conjunction with said transmitting scanning means for projecting thereon images representative of selected color-components of a scene and having a cyclically recurrent series of four color filters arranged in the order of a red filter, a green filter, another red filter, and a blue filter; means for placing said red filters in phase with one of said fields and the green and blue filters in phase alternately with the other of said fields; and color-additive apparatus operable in conjunction with said receiving scanning means for adding color to images produced thereby in a cyclically recurrent color series of the same number and color order as said color-selective means, and including red color means for coloring images in the field scanned by said receiving scanning means synchronously with the scanning of said one field by said transmitting scanning means, and green and blue color means for coloring images in the other field scanned by said receiving scanning means.

3. In a color television system, in combination with scanning means for transmitting and for receiving a picture composed of two spacial fields: color-selective apparatus operable in conjunction with said transmitting scanning means for projecting thereon images representative of selected color-components of a scene and having a cyclically recurrent series of four color filters arranged in the order of a red filter, a blue filter, another red filter, and a filter of a color selected from the central portion of the spectrum to provide a white light balance with the others of said filters; means for placing said red filters in phase with one of said fields and the other two filters in phase alternately with the other of said fields; and color-additive apparatus operable in conjunction with said receiving scanning means for adding color to images produced thereby in a cyclically recurrent color series of the same number and color order as said color-selective means and including red color means for coloring images in the field scanned by said receiving scanning means synchronously with the scanning of said one field by said transmitting scanning means, blue color means for coloring alternate appearances of images in the other field scanned by said receiving scanning means, and color means of said selected balancing color for coloring the other images in said other field.

4. In a color television system, in combination with scanning means for transmitting and for receiving a picture composed of two spacial fields: color selective apparatus operable in conjunction with said transmitting scanning means for projecting thereon images representative of selected color-components of a scene and having a cyclically recurrent series of four color filters arranged in the order of a red filter, a blue filter, another red filter, and a filter of a color selected from the central portion of the spectrum to provide a white light balance with the others of said filters; means for placing said red filters in phase with one of said fields and the other two filters in phase alternately with the other of said fields; color-additive apparatus operable in conjunction with said receiving scanning means for adding color to images produced thereby and having a cyclically recurrent series of four filters of substantially the same colors and balance as the filters of said color-selective apparatus and arranged in the same order; and means for placing said color-additive means in the same phase relationship to the fields scanned by said receiving scanning means as the color-selective means bears to the fields scanned by said transmitting scanning means.

5. In a color television system, in combination with scanning means for transmitting and for receiving a picture composed of two spacial fields: color selective apparatus operable in conjunction with said transmitting scanning means for projecting thereon images representative of selected color-components of a scene and having a cyclically recurrent series of four color filters arranged in the order of a filter of a color selected from one end of the spectrum, a filter of a color selected from the other end of the spectrum, a filter of a color selected from the same end of the spectrum as said first mentioned filter, and a filter of a color selected from the central portion of the spectrum to provide a white light balance with the others of said filters; means for placing said first and third mentioned filters in phase with one of said fields and the other two filters in phase alternately with the other of said fields; color-additive apparatus operable in conjunction with said receiving scanning means for adding color to images produced thereby and having a cyclically recurrent series of four filters of substantially the same colors and balance as the filters of said color-selective apparatus; the filters of color selected from said one end of the spectrum being applied to the field scanned by said receiving scanning means in phase with the scanning of said one field by said transmitting scanning means and the filters of the other two colors being applied respectively to alternate scannings of the other field by said receiving scanning means.

6. In a television transmission system, in combination with pickup means having a color-biased photosensitivity whereby one color effects a lower degree of photosensitive reaction than another color, color-selective apparatus comprising filters for said colors arranged to be applied to the optical path of said pickup means in a cyclical sequence in which filters for said one color and filters for said other color are applied to said path at a frequency ratio substantially inverse to the ratio of photosensitive reaction effected by said colors upon said pickup means.

7. In a television transmission system, in combination with a pick-up tube having a color-bias toward a definite zone of the visible spectrum, color-selective apparatus comprising filters of complementary color components selected from said zone and from two other zones of the spectrum and arranged for application to the optical path of said tube in a four-part cycle in which filters for color components selected from a zone distant from the zone toward which said tube is biased are applied in alternation with filters for the other two color components.

8. In a television transmission system having a pick-up tube arranged to scan two interlaced fields, color-selective apparatus comprising filters for complementary color components arranged for application to the optical path of said tube in a four-part cycle in which filters for color from one end of the spectrum are synchronized with the scanning of one of said fields, and filters for color from the central portion of the spectrum and from the other end of the spectrum are synchronized with alternate scannings of the other of said fields.

9. In a television transmission system having a pick-up black-and-white tube arranged to scan two interlaced fields, color-selective apparatus comprising filters for red, green, and blue light arranged in a four-part cycle, in which red filters are synchronized with alternate scannings of one of said fields, and green and blue filters are synchronized with alternate scannings of the other of said fields and circuit means for transmitting the resultant signals.

10. In a television receiving system having a black-and-white receiving tube in which two interlaced fields are scanned to produce interlaced picture signals upon a receiving raster: color-selective apparatus arranged to impress red, green, and blue color upon said picture signals in a sequence of red, green, red, and blue; and means for synchronizing the impression of red color with the appearance of picture signals in one of said fields and the impression of green and blue color alternately with the appearance of picture signals in the other of said fields.

11. In a television receiving system in which two interlaced fields are scanned to produce interlaced picture signals upon a receiving raster: color-additive apparatus arranged to impress upon said picture signals complementary color components in a four-part sequence in which color components from one end of the visible spectrum form the first and third parts and color components from the central portion and the other end of the visible spectrum form the second and fourth parts, and comprising a plurality of means individually selective of said color components, said means representative of the first and third parts of said sequence being disposed in the line of vision to one field of said raster when said one field is scanned and said means representative of the second and fourth parts of said sequence being disposed in the line of vision to the other field of said raster when said other field is scanned so as then alternately to color the light emanating from said raster.

12. In a television receiving system in which two interlaced fields are scanned to produce interlaced picture signals upon a receiving raster: filter apparatus arranged to interpose complementary color filters in the optical axis of said receiving system in a four-part sequence in which color components from one end of the visible spectrum form the first and third parts and color components from the central portion and the other end of the visible spectrum form the second and fourth parts the filters selective of the color components of the first and third parts of said sequence being disposed in the line of vision to one field of said raster when said one field is scanned, and the filters selective to the color components of the second and fourth parts of said sequence being disposed in the line of vision to the other field of said raster so as respectively to color alternate images appearing in said other field.

References Cited in the file of this patent

UNITED STATES PATENTS

| | | |
|---|---|---|
| 2,378,746 | Beers | June 19, 1945 |
| 2,416,918 | Goldsmith | Mar. 4, 1947 |
| 2,429,849 | Somers | Oct. 28, 1947 |
| 2,445,791 | Schroeder | Aug. 10, 1948 |
| 2,492,926 | Valensi | Dec. 27, 1949 |
| 2,567,040 | Sziklai | Sept. 4, 1951 |
| 2,567,240 | Sites | Sept. 11, 1951 |